Patented Nov. 22, 1938

2,137,343

UNITED STATES PATENT OFFICE 2,137,343

CHEMICAL PROCESS

Robert W. Maxwell, Wilmington, Del., assignor to E. I. du Pont de Nemours & Company, Wilmington, Del., a corporation of Delaware No Drawing. Application August 30, 1937, Serial No. 161,695

19 Claims. (Cl. 260—152)

This invention relates to the preparation of cellulosic ethers and more particularly to the manufacture of cellulose ethers which are insoluble in organic solvents, and still more particularly to the manufacture of cellulose ethers of low degrees of substitution which are soluble in alkalis and insoluble in organic solvents.

This invention has as an object the preparation of low-substituted alkali-soluble cellulose ethers in a simplified manner. A further object is the preparation of low-substituted ethers of a high degree of uniformity. A still further object is the preparation of low-substituted cellulose ethers with great economy of reagent. Another object is the preparation of low-substituted cellulose ethers of low degrees of degradation. These and other objects will more clearly appear hereinafter.

It is customary to prepare low-substituted cellulose ethers, particularly those which are alkali-soluble, by treating alkali cellulose made with aqueous caustic soda solution of 12 to 25% concentration with etherifying agent at room temperature or at elevated temperatures. The use of alkali concentrations below this range gives alkali-insoluble products. Alkali concentrations above 25% give products which are insoluble or of very poor solubility. Even when it has been considered desirable to introduce only a small proportion of an ether group in the cellulose, it has been necessary to use comparatively large quantities of reagent. This is due to the fact that in making alkali cellulose in the usual way by steeping cellulose in aqueous alkali solution and expressing the excess, it is exceedingly difficult to reduce the quantity of alkali solution to less than one part per part of cellulose. Theoretically, for small proportions of reagent an equivalent quantity of alkali is needed. Thus, if it is desired to react cellulose with 0.1 mol of dimethyl sulfate, 0.1 mol of sodium hydroxide is needed; but if for every glucose unit (equivalent weight 162), 162 parts of aqueous solution must be present, then the concentration of alkali needed will be the weight of 0.1 mol of sodium hydroxide (4) divided by the weight of the solution (162) which equals 2.47%. If cellulose is steeped in 2.47% sodium hydroxide and then treated with an equivalent quantity of etherifying agent, scarcely any etherification takes place, most of the etherifying agent being hydrolyzed to useless by-products. In practice, this difficulty is overcome by using considerably stronger caustic in preparing the alkali cellulose. This permits more efficient use of the comparatively expensive etherifying agent but makes necessary the use of a large excess of caustic. For instance, if cellulose is steeped in 18% caustic and pressed until it contains one part of solution for one part of cellulose, then 29 parts of caustic soda will be associated with 162 parts of cellulose. This is approximately 0.75 mol of caustic. If it is desired to treat the alkali cellulose with 0.1 mol of etherifying agent, 7.5 times as much caustic as that required to react with the etherifying agent is present. With 0.25 mol of etherifying agent there is still a 200% excess. With 0.5 mol of etherifying agent the excess is still 50%. Since in actual practice it is common to use alkali celluloses containing steeping liquid equal to twice the weight of the cellulose, the excess of caustic is usually considerably greater. In the manufacture of low-substituted cellulose derivatives which must be cheap since they must compete with products such as starch, viscose, dextrin, and even cellulose itself, excessive use of caustic may sometimes be a serious item of expense. Furthermore, even at these higher caustic concentrations, loss of reagent due to reaction with water and caustic to form by-products is considerable. In the manufacture of highly substituted cellulose ethers which are soluble in organic solvents where much larger quantities of etherifying agents are used, it has been proposed to overcome these difficulties by removal of water from the alkali cellulose by dehydration before the addition of the etherifying agent or during the etherification. This remedy has not been applied to the preparation of low-substituted ethers of too low a degree of substitution to be soluble in organic solvents. However, if it had been applied in the conventional manner, it would not have been possible to prepare low-substituted alkali-soluble ethers in this manner because alkali cellulose which has been dehydrated to a point substantially free of water does not give alkali-soluble ethers when treated with etherifying agents such as sodium chloro-acetate or sodium methyl sulfate. Conversely, it would not be possible to prepare high-substituted ethers by the process of the present invention since the etherifying agent is dissolved in the caustic alkali solution and not enough etherifying agent can be so dissolved to give a high degree of substitution.

I have found that the disadvantage of customary methods of preparing low-substituted ethers involving the use of excessive quantities of caustic as well as the difficulty in preparing caustic-soluble ethers by the prior dehydration process can be overcome by treating cellulose with a solution of etherifying agent in a caustic alkali solution and afterwards concentrating the caustic and etherifying agent in the treated material by removal of the common solvent either before or during the etherification.

In carrying out my invention, cellulose is treated with a solution of caustic alkali and etherifying agent. The treatment preferably is effected by steeping cellulose in bulk or sheet form in an excess of an alkaline solution containing the etherifying agent and after the cellulose has been thoroughly impregnated, reducing the quantity of steeping liquor by a procedure such as centrifuging or pressing below that which would normally be held by the cellulose when allowed to drain freely. Following this, the solvent for the etherifying agent and the alkali is removed by evaporation. The etherification reaction may taken place to some extent during the evaporation stage but for the most part is effected after the bulk of solvent has been removed. If the etherifying agent is sufficiently reactive, the reaction is brought about simply by allowing the dry reaction mixture to stand; otherwise reaction is effected by applying heat. By the use of high temperatures, exceedingly fast reaction can be effected.

Etherifying agents suitable for the reaction must be soluble in solvents for caustic alkalis. Good solvents for the caustic alkalis are the lower alcohols and water; it is therefore preferred that the etherifying agent be water- or alcohol-soluble. The etherifying agent should be substantially non-volatile under the conditions of the solvent removal and reaction. This is desirable because no agitation takes place during the reaction and accordingly etherifying agent which escapes from the reaction mass cannot be reintroduced into the mass in a uniform manner. The etherifying agent should also be relatively stable toward alkali, at least, under the conditions of solvent removal. The degree of reactivity of the etherifying agent is preferably not very high, although by working cautiously it is possible to use many agents of greater reactivity which might not give satisfactory results under less carefully controlled conditions.

The concentration of caustic alkali in the solution in which the etherifying agent is dissolved should be less than 18% sodium hydroxide or its equivalent, i. e., less than mercerizing strength, and concentrations below 12% are preferred since degradation of cellulose is reduced as the quantity of caustic is reduced and these lower concentrations also furnish sufficient alkali for the reaction.

In the preparation of the steeping solution, the proportion of etherifying agent and alkali present is best determined by experiment and will, in general, be governed by conditions of reaction and type of product which it is desired to make. From the standpoint of economy, it is usually desirable to have etherifying agent and alkali present in substantially equivalent amounts or the alkali present in small excess. In calculating the quantity of caustic alkali solution, allowance must be made for alkali which combines with the cellulose by adsorption from the solution. This proportion is best determined by experiment since the concentration and nature of etherifying agent will cause some variation. In some cases the etherifying agent may also be taken up by the cellulose and allowance for this effect must also be made in calculating the composition. Although it is preferred to have alkali and etherifying agent present in the reaction mixture in approximately equivalent amounts, the invention is not limited to these proportions and in many cases it is desirable to avoid these proportions. Thus, if it is desired to make a product of very high viscosity, a quick reaction is advisable and excess of etherifying agent may be used. On the other hand, if it is desired to make unusually efficient utilization of etherifying agent and the degradation is not to be strictly limited, then an excess of caustic alkali may be used.

The time and temperature of steeping will depend on the reagents used and the type of product to be made. In general, impregnation of the fibers with steeping liquor is very rapid and is usually complete within a few minutes. Steeping solutions containing low quantities of etherifying agent give more rapid impregnation than solutions containing the same proportion of alkali and larger proportions of etherifying agent. Solutions containing etherifying agents which are reactive toward the solvent should be maintained at low temperatures, whereas those composed of less active materials such as sodium ethyl sulfate can be heated as high as 50° or more for the steeping step. High temperatures are of advantage when it is desired to reduce the weight of the pressed material to an unusually low figure. This is because the cellulose swells in warm steeping liquor to a lower degree than in steeping liquor at lower concentrations. If the etherifying agent is very reactive, it is preferable to steep at a low temperature at a high speed to avoid saponification.

Agents which increase the swelling or which improve the wetting of the cellulose by the steeping liquor may be added in small proportions. These, in general, improve the solubility of the resulting product. The sodium salt of acids derived from higher branched chain alcohols produced in the methanol synthesis are especially useful when present in concentrations of less than 1% based on the total steeping liquor.

After steeping, the cellulose is pressed to reduce the quantity of steeping liquor present. The amount of steeping liquor left in the cellulose will depend upon the amount of reagent which it is desired to leave in the final dehydrated reaction mixture. This may amount to as much as the liquor which will not drain freely from the cellulose by gravity without external pressure or may be as small as the quantity left after the most strenuous pressing. In general, it is desirable to reduce the ratio of the steeped and pressed material to not more than 4.5 times the weight of the original cellulose. With especially dense forms of the cellulose it may not be possible to attain this high a ratio. In such instances a less dense cellulose may be used. It may also be taken as a general rule that the press ratio should be kept as low as possible without the application of unusual mechanical pressure because this reduces the quantity of solvent which must be evaporated. The cellulose tends to swell less in alkaline steeping solutions containing etherifying agents than it does in solutions of the same alkali concentration containing no etherifying agent.

The dehydration step is preferably effected by passing the cellulose impregnated with the etherifying liquor over hot drying rolls or through a drying column where it is met by a blast of warm air. Drying is simplified if the material is in the form of a continuous web or individual sheets which can be handled upon a conveyor. For this reason, the invention is especially applicable to cellulose in the form of a continuous sheet from a roll. Where the reagent is easily decomposed by reaction with solvent and high temperatures, the drying step is preferably effected by applying a vacuum or by blowing with air at room temperature or slightly higher.

The etherification reaction may be effected by passing the dried mixture through an oven heated to any desired temperature below the temperature of decomposition, that is to any temperature up to about 250°, and under these conditions etherification is often complete within a few minutes. If desired, the mixture of cellulose with etherifying solution may be passed through such a hot tower and the reaction allowed to take place partly during the drying step. Alternatively, the dried product may be stored at room temperature or at elevated temperature to allow reaction to occur. If no excess of caustic has been used, the product may be stored for long periods of time without purification and without degradation after the reaction. Degradation due to oxidation during the reaction period can be minimized by the exclusion of air by mechanical means such as pressing or evacuating or by displacing air with an inert gas such as nitrogen.

The removal of solvent is preferably carried at least to the point where the reaction mixture feels dry to the touch. At this point it usually contains less than about 35% solvent based on the weight of cellulose. The benefits of solvent removal accrue to an increasing degree as the proportion of solvent present is removed.

The following examples illustrate the invention. Parts are by weight.

Example I

Methyl cellulose

One hundred (100) parts of mercerized sulfite pulp were steeped in a mixture of 1000 parts of 7.5% sodium hydroxide and 200 parts of sodium methyl sulfate of 90% purity. After steeping for one hour at 25° the sheets were pressed to 340 parts and heated in a blast of air at 65° until the sheets were dry. This required forty minutes. The dry sheets were placed in a container, the air surrounding them displaced with nitrogen and allowed to age for three days at 60°. The reacted sheets were purified by allowing a slow stream of water to percolate through them. The product was mixed to a slurry containing 7% cellulose and 7% sodium hydroxide. On cooling to below 0° it gave a viscous, ropy solution which after filtration could be cast to strong, transparent films of excellent quality in a sulfuric acid-sodium sulfate bath. The high viscosity of the product made it especially suitable for textile sizing. Five per cent solutions made by chilling the product in 7% sodium hydroxide were practically fiber-free.

Example II

Example II illustrates the difference in results obtained by the use of equivalent proportions of caustic in low concentration compared with those obtained by the use of the same proportions of caustic accompanied by dehydration before reaction.

Methyl cellulose

A steeping liquor was prepared by dissolving 556 parts of sodium methyl sulfate of 95% purity in 2000 parts of 9% sodium hydroxide. To this was added 20 parts of a wetting agent consisting of the sodium salts of acids derived from alcohols made by the reduction of carbon monoxide catalytically under pressure. This served to assist the steeping solution in impregnating the cellulose. In this liquor there were steeped 162 parts of sulfite cellulose containing 88% alpha-cellulose and 7% moisture. After steeping three hours at 25° the sheets of cellulose were scarcely swollen any more than by water itself. The sheets were pressed to 280 parts and divided into four portions.

(a) One portion of the pressed reaction mixture was stored at 60° for ninety-six hours. The sheets were then purified by washing with water until free of salts. Upon mixing with 7% sodium hydroxide in quantity sufficient to give a slurry containing 5% of methyl cellulose and chilling to −10° (freezing), a gelatinous slurry resulted which set to a stiff gel soon after being warmed to room temperature.

(b) Same as (a) except the pressed sheets were first evaporated to dryness by heating in a slow current of air at 60° for one hour. After standing for ninety-six hours at 60° the product was purified by washing with water. Upon forming to a slurry containing 5% methyl cellulose and 7% sodium hydroxide and cooling the mixture to −10°, a fine, almost fiber-free, viscous, ropy solution resulted. The product was soluble to give a 3% solution in 10% sodium hydroxide by cooling to 10°. This solution was viscous and practically fiber-free.

(c) Same as (a) except the pressed sheets were stored in an atmosphere of nitrogen at 36°. Even after three months of aging, the product gave only a gelatinous slurry after cooling in 7% sodium hydroxide below the freezing point.

(d) Same as (c) except that the sheets were evaporated to dryness at 60° in a gentle current of air before storing. After aging for ten days at 36° the methyl cellulose could be dissolved in 7% sodium hydroxide by cooling to near the freezing point to give viscous solutions. Films prepared from these solutions by coagulation with a bath containing 10% sulfuric acid and 15% sodium sulfate were bright, clear, and of high wet strength. The solution when applied to textiles and coagulated with a 5% sulfuric acid bath gave a starched effect which was laundry-fast.

Example III

Methyl cellulose

Same as Example II(a) and (b) except that the reaction was carried out at 105°. The dried reaction mixture gave a methyl cellulose of very good solubility in 7% sodium hydroxide upon cooling, whereas the sheet which had not been dried after heating for four days at 105° in a closed container gave a product which could not be dissolved in 7% sodium hydroxide even after cooling to the freezing point.

Example IV

Methyl cellulose

A liquor was made up composed of 1000 parts of 7.5% sodium hydroxide and 200 parts of sodium methyl sulfate of 90% purity. A thin slurry of bulk sulfite pulp was made with the liquor. After a few minutes the slurry was dewatered on a continuous rotary suction filter and the dewatered product removed from the filter as a continuous sheet on wires. The wet sheet which still contained considerable quantities of moisture was passed through two sets of squeeze rolls which increased the ratio of cellulose to liquid to 0.5. The sheet was dried by passing through a drying tunnel after which it was cut into individual sheets and permitted to stand for ten days at 36°. The sheets were purified by washing in a beater after which the product was dewatered on a continuous rotary suction filter and dried. The products gave a solution of high viscosity when made to 5% in 7% sodium hydroxide and cooled to −10°.

EXAMPLE V

Methyl cellulose

Same as Example IV except that the pulp was added continuously to the steeping tank and the liquor in the steeping tank was constantly replenished with new liquor and press liquid from the filter and press rolls.

EXAMPLE VI

Methyl cellulose

Same as Example IV except that the sheets were stored at 100° for twelve hours. The product could not be distinguished from that of Example IV.

EXAMPLE VII

Methyl cellulose

Same as Example IV except that the dried reaction sheet was wound into a roll instead of being cut into individual sheets. Even after several months' storage without purification the viscosity of the material when dissolved in 7% caustic by cooling was still very high.

EXAMPLE VIII

Methyl cellulose

Same as Examples IV to VII using any combination of the steps described therein except that the cellulose is added to the steeping mixture in the form of a wet slurry.

EXAMPLE IX

Methyl cellulose

Same as Example IV except that the concentration of reagent in the steeping liquor was cut in half. The dried product was insoluble in 7% sodium hydroxide even upon cooling. The dried sheets were found to be suitable for xanthation without purification simply by steeping in 18% sodium hydroxide (as in ordinary viscose practice), pressing, shredding, aging, and xanthating. Filaments prepared from the viscose were found to possess an unusually pronounced affinity for direct dyes such as Pontamine Sky Blue 6BX.

EXAMPLE X

Ethyl cellulose

Same as Example IV except the sodium methyl sulfate was replaced by an equivalent quantity of sodium ethyl sulfate. It was found necessary to age the reaction mixture three times as long as was found necessary with sodium methyl sulfate under the same conditions. The properties of the product resembled those of the product of Example IV.

In general, when using sodium ethyl sulfate, it is preferable to increase the reaction temperature by about 20° rather than to increase the reaction time.

EXAMPLE XI

Ethyl cellulose

Same as Example III(b) except that the reaction temperature was 125° and the sodium methyl sulfate was replaced with an equivalent quantity of sodium ethyl sulfate.

EXAMPLE XII

Methylated fabric

Unbleached sheeting was steeped and passed continuously through a bath of the same composition as that used in Example I. After removal of the excess steeping liquor either by the use of squeeze rolls when the operation was conducted continuously, or by centrifuging when the operation was a batch treatment, the fabric was dried at 35° and then stored at 35° for ten days. The product after purification by washing with water was found to possess a faint yellow color which could be removed by bleaching. The fabric exhibited a pronounced affinity for direct dyes such as Pontamine Sky Blue 6BX. The fabric was found to be insoluble in alkali.

In fabric treatment it has been found of advantage to maintain an atmosphere of nitrogen about the material at least during the first part of the reaction when the caustic concentration is at its highest point.

EXAMPLE XIII

Methylated long fiber cotton

Long fiber staple cotton was steeped in a bath of the same composition as that used in Example I. The fibers were centrifuged to a liquid content of 60% after which they were dried in a tumbling drier. After aging for ten days at 35°, the fibers were washed free of reactants and dried. They showed an increased affinity for direct dyes and showed a greater absorptive power for water than the starting fibers. The product was insoluble in alkalis.

The process offers considerable advantage in the etherification of long fiber cotton in that it avoids the use of mercerizing strength caustic which causes undesirable physical effects with cotton fibers to be used later for textile purposes.

EXAMPLE XIV

Glycerol cellulose

One hundred eighty (180) parts of sulfite cellulose were steeped in water and then pressed to 200 parts. The wetted cellulose was placed in a shredder and, while shredding, 180 parts of a solution prepared by mixing 1000 parts of 12% sodium hydroxide with 250 parts of glycerin monochlorohydrin were allowed to drip in slowly, the temperature of the entire mixture being maintained at 10°. After one hour the shredded material was removed and dried by passing a blast of air at 25° through the mass. The mass was allowed to age for forty-eight hours at 25° after which it was found to be soluble in 10% sodium hydroxide at room temperature. The glycerol cellulose-caustic solution could be cast to films of excellent quality in a precipitating bath composed of 13% sulfuric acid and 18% sodium sulfate.

EXAMPLE XV

Benzyl cellulose

Sixteen (16) parts of benzyl chloride were dissolved in a solution composed of 95 parts of 95% ethyl alcohol and 5 parts of sodium hydroxide, the temperature being maintained at 10° or lower. After a few minutes the cellulose was removed and pressed to a ratio of 2, i. e., the pressed mixture contained one part of liquid and one of cellulose. The mixture was dried in a blast of air at 20° after which it was allowed to stand for seventy-two hours at 80°. The resulting product was water-repellent and showed scarcely any affinity for ordinary direct dyes such as Pontamine Sky Blue 6BX. The product was insoluble in all solvents.

Treatments with benzyl chloride or other alkyl halides are especially interesting textile treatments.

Example XVI

Cellulose glycolic acid ether

A steeping solution was prepared composed of 1000 parts of 7.5% sodium hydroxide and 180 parts of sodium chloroacetate. The steeping solution was maintained at 10° to minimize reaction of caustic with the sodium chloroacetate. One hundred (100) parts of sulfite pulp were steeped in this mixture for fifteen minutes after which it was pressed to 340 parts. The sheets were evaporated to 25% moisture content by a rapid stream of air at 35°. They were then allowed to stand at 25° for twenty-four hours after which they were purified by washing with water containing a little sulfuric acid to liberate cellulose glycolic acid ether from its sodium salt. The sheets were washed acid-free and dried. The product gave fair solutions in 10% sodium hydroxide at 25° which upon cooling were stable, substantially fiber-free, and well suited for the preparation of transparent sheeting by coagulation in a sulfuric acid-sodium sulfate bath. Seven per cent mixtures of the product with 7% sodium hydroxide were gelatinous but upon cooling below 0° formed very good solutions of high viscosity and excellent stability.

Too prolonged a drying period in the presence of air obviously leads to neutralization of some caustic by carbon dioxide. When this occurs the solubility of the product is not good, or numerous partly reacted or unreacted fibers are present.

Example XVII

Continuous preparation of cellulose glycolic acid

Sulfite pulp was passed continuously into a steeping bath composed of 59 parts of sodium chloroacetate, 13 parts of sodium hydroxide and 151 parts of water. The temperature of the steep was 50° C., the steeping time approximately three minutes. After passage of the sheet through squeeze rolls to yield a press ratio of 2.1, the sheet was passed through a heating unit at a rate of six inches per minute. A blast of air at about 180° was passed through the heating unit. This served to dehydrate the sheet and maintain reaction temperature. The material was then shredded, acidified with very dilute sulfuric acid, and then washed with water until neutral to methyl orange. It was dried at 55° C.

A 4% solution of this material in 9% sodium hydroxide was prepared by chilling the slurry to −5° C. and stirring for twenty minutes. The solution was of very high viscosity and remained fluid after standing for one week at 25°.

Example XVIII

Continuous preparation of methyl cellulose

Sulfite cellulose in the form of a continuous sheet was passed continuously into a steeping bath composed of 25% sodium methyl sulfate, 6% sodium hydroxide and 69% water. The temperature of the steep was maintained at 40° C. The time of steeping was approximately ninety seconds. After passage of the pulp sheet through squeeze rolls to yield a press ratio of 2.5, the sheet was passed through a three-foot heating tower at a rate of one foot per minute. An air blast at 235° C. was blown through the tower. After the heating step which served to dehydrate the mixture and effect reaction, the material was shredded, washed with water and dried at 45° C. A 3% solution of this material in 10% sodium hydroxide gave an excellent, practically fiber-free solution after chilling to −5° C. and stirring for twenty minutes. The viscosity was approximately 15 poises.

Example XIX

Methyl cellulose (a) Sixty (60) parts of high alpha wood pulp cellulose were steeped for fifteen minutes in 500 parts of a solution composed of 10% sodium methyl sulfate and 4% sodium hydroxide. The sheets were then pressed to 180–190 parts and placed in an oven at 130° C. to dehydrate and react. Portions were removed at the end of one-half, one, two and three hours. Products of best solubility were obtained with two to three hours' heating. These formed viscous solutions of 5–7% concentration in 10% sodium hydroxide after cooling to −5° C. Five per cent solutions in 7% sodium hydroxide exhibited some tendency to gel. A methyl cellulose made using 20% sodium methyl sulfate instead of 10% was similar in properties.

(b) Same as (a) except that the starting cellulose was sulfite wood pulp. The product was of lower viscosity than the product of (a) but was of better solubility in sodium hydroxide solution.

Films cast from these solutions by spreading on glass plates and immersion in a bath composed of 13% sulfuric acid and 18% sodium sulfate were of satisfactory transparency and good physical properties.

The invention is by no means limited to the conditions and to the reagents set forth in the specific embodiments above, but on the contrary it comprehends numerous equivalents of these reagents and wide variation from these conditions within the limits below indicated.

Among the etherifying agents suitable for the reaction are the alkali metal alkyl sulfates such as sodium methyl- and sodium ethyl-sulfates; halogen compounds derived from polyatomic alcohols, such as glycerin monochlorohydrin, the alkali metal alkyl sulfates derived from polyatomic alcohols such as diethyleneglycol, propylene glycol and ethylene glycol, the halogen-substituted fatty acids in the form of their alkali metal salts or esters, and alkyl halides such as benzyl chloride, substituted benzyl chlorides, etc. Mixtures of etherifying agents can be used or the reaction can be carried out with two different etherifying agents in succession. The preferred etherifying agents to be used in the invention because of their especially appropriate reactivity are the alkali metal alkyl sulfates derived from alcohols containing not more than two carbon atoms. For the same reason slightly volatile or non-volatile water-soluble halohydrins of low molecular weight such as glycerin monochlorohydrin and low molecular weight straight chain alpha-halogenated aliphatic fatty acids such as chloroacetic acid are also preferred.

All solvents which are solvents for the particular alkali being used and for the etherifying agent as well, are suitable. Water is preferred above all others because of its high solvent power for caustic alkalis and its ability to swell cellulose and, accordingly, its ability to carry reagent to the interior of the cellulose fiber.

As starting material for the process, there may be used any of the bodies of the cellulose group. As far as it has been possible to determine, any cellulosic material in which the cellulose hydroxyls can be made available to the reagent are suitable for the process. This includes bleached and unbleached cellulose, hydrocellulose, oxycellulose, cellulose hydrate, textile materials, paper and paper fibers, regenerated cellulose, etc. Purified celluloses, however, are preferred and their use is essential in making alkali-soluble ethers.

Among the alkalis, the caustic alkalis such as sodium and potassium hydroxide or quaternary ammonium hydroxides are most suitable. The concentration of materials in the steeping solution will depend upon the nature of the etherifying agent and the quantity of reagent which it is desired to introduce into the cellulose. Saturated solutions or solutions containing extremely small proportions of the etherifying agents may be used with proportionate quantities of alkali.

The temperature of the steeping liquid may be maintained as low as the freezing point (so long as separation of the steeping liquor into more than one phase does not occur) or it may be maintained at temperatures approaching the boiling point if the stability of the etherifying agent is sufficiently high. For convenience in handling, however, it is usually preferable to operate at room temperature or somewhat lower.

The time of steeping will depend upon the nature of the etherifying bath. It is usually not desirable to steep for a longer period than is necessary to give thorough impregnation.

The quantity of steeping liquor to be left in the pressed material will depend upon the quantity of etherifying agent which it is desired to leave in the reaction mixture. In any case it will not be greater than the quantity of the steeping bath which will remain in the cellulose when allowed to drain freely under the influence of gravity alone. The concentration of etherifying agent in the steeping bath and the quantity of steeping bath left in the pressed material define rather closely the maximum quantity of reagent to be used in the process. The quantity of a given etherifying agent which it is possible to leave in the press-cake (hence the quantity that can be introduced into the reaction mixture) is limited by the solubility of the etherifying agent in the solvent selected and by the capacity of the cellulose to absorb the steeping solution. It follows, therefore, that in selecting the agent for use in any given case that the solubility of the agent in the steeping solution is to be taken into consideration. In other words, the character of the etherifying agent, the form of the cellulose employed, the concentration of the agent and of the alkali in the solvent, and the amount of steeping solution to be left in the press-cake are all to be coordinated to leave in the press-cake the amounts of agent and alkali required to produce a cellulose ether having any required low degree of substitution.

The temperature at which the dehydration step is effected may vary from somewhat below room temperature up to the boiling point of the steeping solution or higher. With reactive etherifying agents, where it is desirable to minimize saponification, dehydration should be carried out at low temperatures, but with more stable etherifying agents such as the alkali metal alkyl sulfates, dehydration can be effected at a fairly high temperature. The process is most economically operated with dehydration at temperatures above room temperature since this permits the process to be carried out most rapidly.

The reaction may be carried out to any desired temperature below the temperature of decomposition, that is to any temperature up to about 250° C., and may be varied depending upon the nature of the etherifying materials, providing the time of treatment is adjusted accordingly. It is impossible to specify any rigid rule for this step because of the wide diversity of conditions required for efficient etherification with different etherifying materials. A fairly general rule, however, is that the more reactive the etherifying agent the lower the temperature at which these operations should be effected.

The invention is useful for the general preparation of low-substituted ethers of cellulose. This comprises the ethers which are of too low a degree of substitution to be soluble in organic solvents. It is especially applicable to the preparation of ethers which are soluble in alkalis, especially those which dissolve in caustic alkalis only after cooling. An especially important use of the invention is for the preparation of modified vegetable textile materials, i. e., for the direct etherification of long fiber cotton, yarn, or woven goods where unique dyeing or luster effect may be obtained. In general, the invention may be used for etherification of cellulose in any undissolved form. The uses of the products of the invention are conventional and will depend upon the nature of the product. The very low-substituted products which are of too low a degree of etherification to be soluble in alkali may be used for any of the purposes for which cellulosic fibers or similar cellulose materials are now used and the etherification will result in unique properties such as dyeing characteristics, wettability with water, swelling with water, etc. The products of somewhat higher degree of substitution which are soluble in alkalis are suitable for the manufacture of films, filaments, laundry-fast textile size for the coating of fabrics with or without filling materials, and as glues and adhesives. They may be used as thickening materials and as fixing media for pigments in textile printing, coatings and layers in any art. All of the products of the invention are suitable as raw materials for further reaction. This includes esterification with conventional agents such as aliphatic anhydrides, carbon disulfide, or etherification to give high-substituted products soluble in water or organic solvents. It is impossible to list all the uses of the products of the invention. Specific ethers will possess certain properties which make them particularly applicable for special uses.

By the process of this invention, low-substituted cellulose ethers can be produced using relatively low proportions of caustic alkali which permits an appreciable saving in reagent cost. The negligible quantity of solvent present in the reaction mixture reduces loss of etherifying agent due to reaction with solvent. The whole process including the etherification reaction can be carried out at high speed because the use of a substantially dry mass permits the use of high temperature which permits a brief reaction period. The process leads to cellulose ethers of very low degrees of degradation. This is surprising because, due to the removal of water during drying, the concentration of alkali is very high based upon the water present during the later stages, and high concentrations of caustic have been considered to exert a harmful action upon cellulose. The procedure is extremely simple compared with other processes, it being necessary only to steep cellulose, remove the excess of steeping liquor and dry. It is obvious that procedures comparable in cost to those involved in the manufacture of paper can be applied. Examples in which the procedure is practically identical with the manufacture of paper have been described. One important advantage of the invention is that it permits the etherification to be carried out from start to finish in a continuous manner with accompanying savings in operating cost. Although it may be considered obvious to carry out the etherification step continuously after carrying out continuous impregnation, the present process permits etherification at high speed since the reaction can be carried out at high temperature due to absence of low-boiling solvents such as water.

The above description is for purposes of illustration only, it being understood that the invention includes all obvious variations and modifications coming within the scope thereof as defined in the appended claims.

I claim:

1. A process for preparing low-substituted cellulose ethers which comprises mixing a cellulosic material with a solution of etherifying agent, and alkali in a suitable volatile solvent, removing the solvent by evaporation, and reacting the mixture until a low-substituted cellulose ether is formed.

2. A process for preparing low-substituted cellulose ethers which comprises mixing cellulose with an aqueous solution of a substantially non-volatile etherifying agent, and alkali, evaporating the mixture until said mixture feels substantially dry to the touch, and reacting the same until a low-substituted cellulose ether is formed.

3. A process for preparing low-substituted cellulose ethers which comprises mixing cellulose with an alcoholic solution of a substantially non-volatile etherifying agent, and alkali, removing the alcoholic solvent by evaporation until the mixture feels substantially dry to the touch, and then reacting the mixture until a low-substituted cellulose ether is formed.

4. A process for preparing low-substituted cellulose ethers which comprises mixing cellulose with an aqueous solution of a substantially non-volatile etherifying agent and sodium hydroxide, drying the mixture by evaporation until said mixture feels substantially dry to the touch, and reacting the same to form a low-substituted cellulose ether.

5. In the process for preparing low-substituted cellulose ethers, the improvement which comprises the simultaneous addition to the cellulose, of etherifying agent and alkali in a common volatile solvent, and the removal of said solvent, prior to reaction, by evaporation until the mixture feels substantially dry to the touch.

6. In the process for preparing low-substituted cellulose ethers, the improvement which comprises the simultaneous addition of etherifying agent and sodium hydroxide, dissolved in water to the cellulose, and the evaporation of the water from the mixture so formed until said mixture feels substantially dry to the touch, prior to etherification of the cellulose.

7. A process for the preparation of low-substituted cellulose ethers which comprises treating a cellulosic material in a liquor comprising essentially an etherifying agent dissolved in a solution of an alkali, whereby a mixture of cellulosic material, etherifying agent, alkali and solvent is formed, removing excess liquor, drying the mixture by evaporation until said mixture feels substantially dry to the touch, and reacting the mixture to form a cellulose ether.

8. A process for the preparation of low-substituted cellulose ethers which comprises steeping cellulose in a liquor comprising essentially a relatively non-volatile etherifying agent dissolved in a solution containing not over 18% sodium hydroxide, whereby a mixture of cellulose, etherifying agent, sodium hydroxide and solvent is formed, pressing to remove excess liquor, drying by evaporation until said mixture feels substantially dry to the touch, and subjecting the mixture to a reaction temperature to form cellulose ethers.

9. A process according to claim 8 wherein the solvent is water.

10. A process according to claim 8 wherein the solvent is alcohol.

11. A process according to claim 8 wherein the etherifying agent is an alkali metal alkyl sulfate derived from an alcohol containing not more than two carbon atoms.

12. A process according to claim 8 wherein the etherifying agent is an alkali metal methyl sulfate.

13. A process according to claim 8 wherein the etherifying agent is a straight chain alpha halogen-substituted low molecular weight aliphatic acid.

14. A process according to claim 8 wherein the etherifying agent is a low-molecular weight water-soluble halohydrin.

15. A process according to claim 8 wherein the etherifying agent is glycerin monochlorohydrin.

16. A process according to claim 8 wherein the sodium hydroxide solution contains not over 12% of sodium hydroxide.

17. A process for the preparation of low-substituted cellulose ethers which comprises the steps of impregnating cellulose with a solution containing equivalent weight of a substantially non-volatile, water-soluble etherifying agent and sodium hydroxide in water, pressing the impregnated material to not over 4.5 times the weight of the original dry cellulose, dehydrating the pressed material by evaporation at least to the point which feels substantially dry to the touch, and then reacting the dehydrated mixture of cellulose, etherifying agent and sodium hydroxide at etherification temperature until a cellulose ether soluble in dilute alkali and insoluble in organic solvents is formed.

18. A process according to claim 17 wherein the solution consists of a substantially non-volatile, water-soluble etherifying agent dissolved in an aqueous solution containing not over 12% of sodium hydroxide, said etherifying agent and said sodium hydroxide being present in substantially equivalent weights.

19. A continuous process for the preparation of low-substituted cellulose ethers which comprises passing cellulosic material serially through a solution comprising essentially an etherifying agent, alkali, and a volatile solvent for said etherifying agent and alkali; through a press zone wherein excess solution is pressed from the impregnated material; through a drying zone wherein the solvent is removed from the material by evaporation; and then through a reaction zone wherein the mixture of cellulosic material, etherifying agent, and alkali react to form a low-substituted cellulose ether.

ROBERT W. MAXWELL.